United States Patent [19]

Herzog et al.

[11] Patent Number: 4,703,356
[45] Date of Patent: Oct. 27, 1987

[54] TELEVISION MULTIPLE FRAME STORE WITH CYCLICAL REPEAT

[75] Inventors: William F. Herzog, Gilroy; William E. Nichols, San Jose, both of Calif.

[73] Assignee: Apert-Herzog Corporation, San Jose, Calif.

[21] Appl. No.: 837,514

[22] Filed: Mar. 7, 1986

[51] Int. Cl.⁴ .............................................. H04N 5/14
[52] U.S. Cl. ................................. 358/160; 358/21 R; 358/111
[58] Field of Search ............... 358/11, 21 R, 111, 112, 358/140, 141, 160, 22

[56] References Cited

U.S. PATENT DOCUMENTS

| 4,302,776 | 11/1981 | Taylor et al. ...................... 358/160 |
| 4,602,275 | 7/1986 | Smith et al. ...................... 358/21 R |
| 4,614,196 | 9/1986 | Sato .................................. 358/112 |

Primary Examiner—James J. Groody
Assistant Examiner—Michael D. Parker
Attorney, Agent, or Firm—David B. Harrison

[57] ABSTRACT

A memory stores and repetitively plays back for display an continuously repeating, consecutive sequence of picture frames derived from a source. The memory includes an input for receiving digitized picture element values in a serial bit stream and for framing the stream into consecutive constant length pluralities of digital picture element words. A read/write solid state semiconductor frame memory array is arranged as a ring for storing and playing back a predetermined number of the consecutive video picture image frames. An output receives constant length pluralities of digital picture element words read from the memory array and converts them into an analog picture signal for display. A read/write memory array control controls writing to and reading from the frame memory array so that a selected segment of consecutive video picture frames may be repeatedly played back without interruption at a real time image display rate. The memory read/write memory array control may include a write protect circuit for enabling an operator to single step through a series of consecutive frames written in the array, the write protect circuit for generating and storing at least one write protection value for write protecting at least one of the frames so written. The read/write memory array control further may include a circuit for skipping said at least one write protected frame during subsequent write operations of the memory array and may also include a clear circuit for clearing the write protection value or values.

11 Claims, 4 Drawing Figures

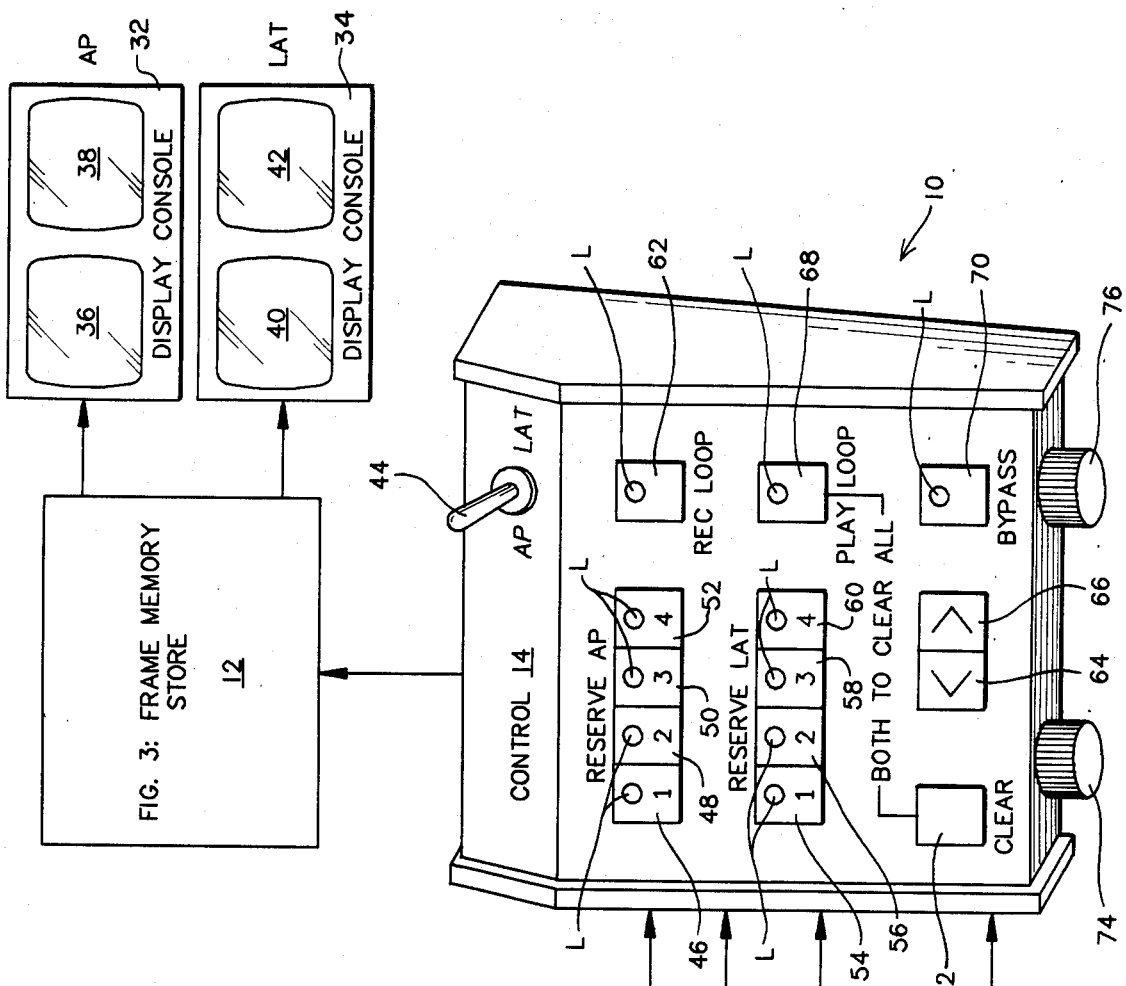
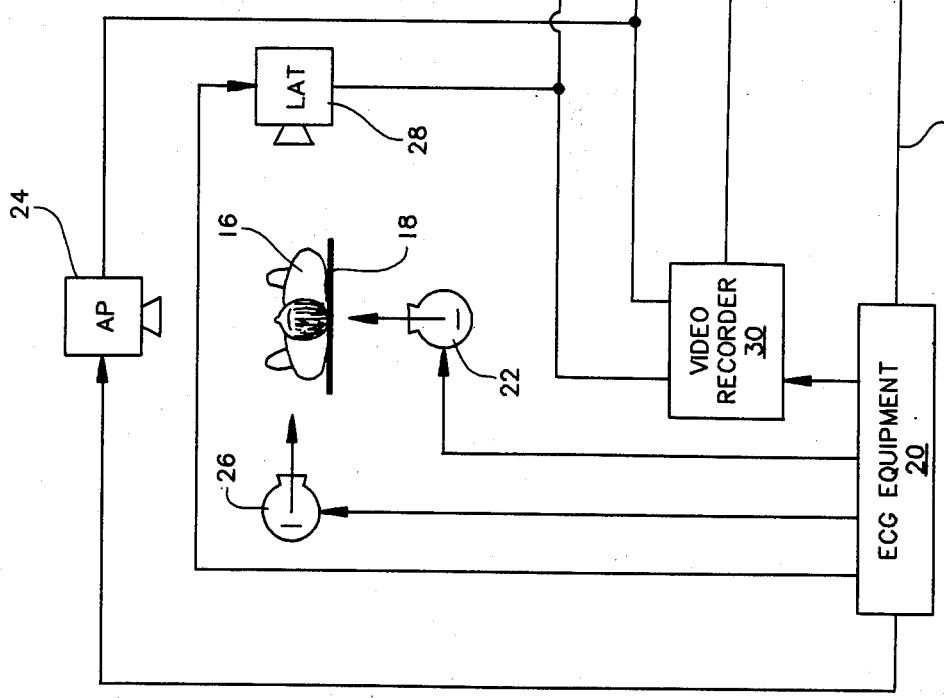
FIG. 1

TELEVISION MULTIPLE FRAME STORE WITH CYCLICAL REPEAT

BACKGROUND OF THE INVENTION

The present invention relates to television processing apparatus and methods. More particularly, the present invention relates to a television multiple frame store having a cyclical repeat capability and may include the ability to write protect one or more selected frames of the cyclical sequence.

Frame store memory systems for television picture images are known in the prior art. Such devices include video tape recorders, disk recorders and solid state memory arrays.

In some specific applications a hitherto unsolved need has arisen for a television frame store which is controlled in a manner which provides unbroken cyclical repetition of a selectable segment of picture frames and which may further include the capability for write protecting one or more single frames of the segment.

One such application has arisen in the medical field. A treatment for heart disease, known an angioplasty, involves the insertion of a catheter into the blood stream of the patient. The catheter is moved to the heart region. A radiopaque dye is released into the bloodstream and x-ray excited television images are produced. These images provide the data necessary to enable the treating physician to locate and treat occluded arteries and veins in the vicinity of the heart.

The dispersal of the radiopaque dye, once released, is quite rapid; and, only a small segment of the television picture images (frames) are relevant to locate the blocked blood vessel or blood vessels in need of treatment. In fact, a single cycle of the heart following release and local dispersal of the dye is sufficient. Because of the ephemeral nature of the x-ray images due to rapid dispersal and dilution of the dye throughout the bloodstream, the initial moments following release of the dye have been routinely recorded, usually with the aid of a helical scan video tape recorder. Such machines have the capability of "freeze frame" and slow motion playback, and have been used to provide selected single images of the procedure. Several drawbacks attend this prior art approach. First, the video tape recorders typically store only a single field (256 horizontal scanning lines or one half the frame image) in a single helical scan. Thus, when that helix is scanned in place in order to display a still image, only one half of the picture is reproduced. Thus, only one half of the available resolution is presented on the display which presents a severe handicap to the treating physician.

A further drawback of the prior art is that when a single image is displayed as a still image over and over, the noise pattern for that selected image is also repeated in place over and over. This noise, which is filtered out during real time by the observer's mental perception process, becomes very apparent and constitutes a further major distraction and reduction of resolution in the picture.

It has been discovered by the inventors that if a selected, relatively short segment of consecutive picture frames is repeated without delay at the real time image scanning rate, the problems which noise are eliminated and the subject matter is much more perceptible and useful to the observer.

While positionable head disk drive memories have the capability to store picture frame sequences, the time required to move the head back to the beginning of the segment practically prevents uninterrupted repetition of the multiple frame sequence. Solid state multiple frame memories are not subject to this delay.

In the television broadcast field a hitherto unsolved need has arisen for a video delay loop of relatively short duration, such as one second. This need is particularly keen in live television programming where it may be necessary to delete expletives and other unanticipated events and to replace live action with a still image during the duration of the unacceptable portion of the live program. While it is known to provide a still frame image in the event that the television signal is lost, that technique still did not provide a preview delay to enable an operator to switch to a still frame manually as a matter of human judgment.

In the design and analysis of industrial processes a hitherto unsolved need has arisen for an analytical tool for presenting an unbroken cyclically repeating sequence of images of process operation in order to understand better the process in question and to develop and improve the process being observed.

SUMMARY OF THE INVENTION WITH OBJECTS

A general object of the present invention is to provide a television multiple frame store having a cyclical repeat capability in a manner which overcomes limitations and drawbacks of the prior art.

A specific object of the present invention is to provide a television image multiple frame store having not only a cyclical repeat capability and also the the ability to select one or more frames of the cyclical sequence and write protect and display those frames even though subsequent sequences may be acquired and stored in the frame store.

The system of the present invention is included in a video path having a source of television picture images and a display. The system includes a solid state memory for storing and for repetitively playing back at the display a consecutive sequence of picture frames derived from the source. The memory includes an input for receiving the consecutive sequence of picture frames as digitized picture element values in a serial bit stream and for framing the stream into consecutive constant length pluralities of digital picture element words. The memory includes a read/write frame solid state memory array arranged as a ring for storing and playing back a predetermined number of selected, consecutive video picture image frames. An ouptut receives constant length pluralities of digital picture element words read from the memory array and converts them into an analog picture signal for display on the display. A read/write memory array control controls writing to and reading from the frame memory array. The memory control may include circuitry enabling an operator to single step through a series for consecutive frames written in the array. And it then generates and stores at least one write protection value for write protecting at least one of the frames so written. The read/write memory array control includes circuitry for skipping the one or more write protected frames during subsequent write operations of the memory array means. A clear circuit may be included in the memory array control for clearing the one or more write protection value.

In one aspect of the present invention, the output circuit includes two independent output paths so that a single write protected frame may be put out for display on one display on one of the paths and a sequence of consecutive frames may be put out for display on the other of the paths.

In another aspect of the present invention, the output circuit includes a digital gamma correction circuit for varying the dynamic range of consecutive picture elements, the circuit preferably including a plurality of table lookups. contained in a read only lookup memory and a selector for enabling selection and processing of one of the lookup tables to provide selected gamma correction.

In a further aspect of the present invention the memory array control includes a variable frame number selector for varying the number of consecutive picture frames to be stored during a single write loop through the ring memory array, in response either to an external frame number selection signal or to a manual frame number selector.

In one more aspect of the present invention the read/write memory array control includes a manual write control for enabling initiation of writing of consecutive frames into said memory array means.

In a further aspect of the present invention the read/write memory array control includes a manual playback control for causing the memory array to cease writing consecutive frames and for causing it to read out repetitively the consecutive picture frames then stored therein.

In one more aspect of the present invention, the read/write memory array control includes a manually operable single step circuit for causing the memory array to read out one of the consecutive picture frames then stored therein as selected by the single step circuit from the available ones of the picture frames then stored in the array.

These and other objects, advantages and features of the present invention will be more fully understood and appreciated upon considertion of the following detailed description of a preferred embodiment, presented in conjunction with the accompanying drawings.

BRIEF DESCRIPTION OF THE DRAWINGS

In the drawings:

FIG. 1 is a diagrammatic view of a system incorporating the principles of the present invention installed in a medical operating environment for use in connection with diagnosis and treatment of cardiovascular disease.

DETAILED DESCRIPTION OF A PREFERRED EMBODIMENT

Figure 2:
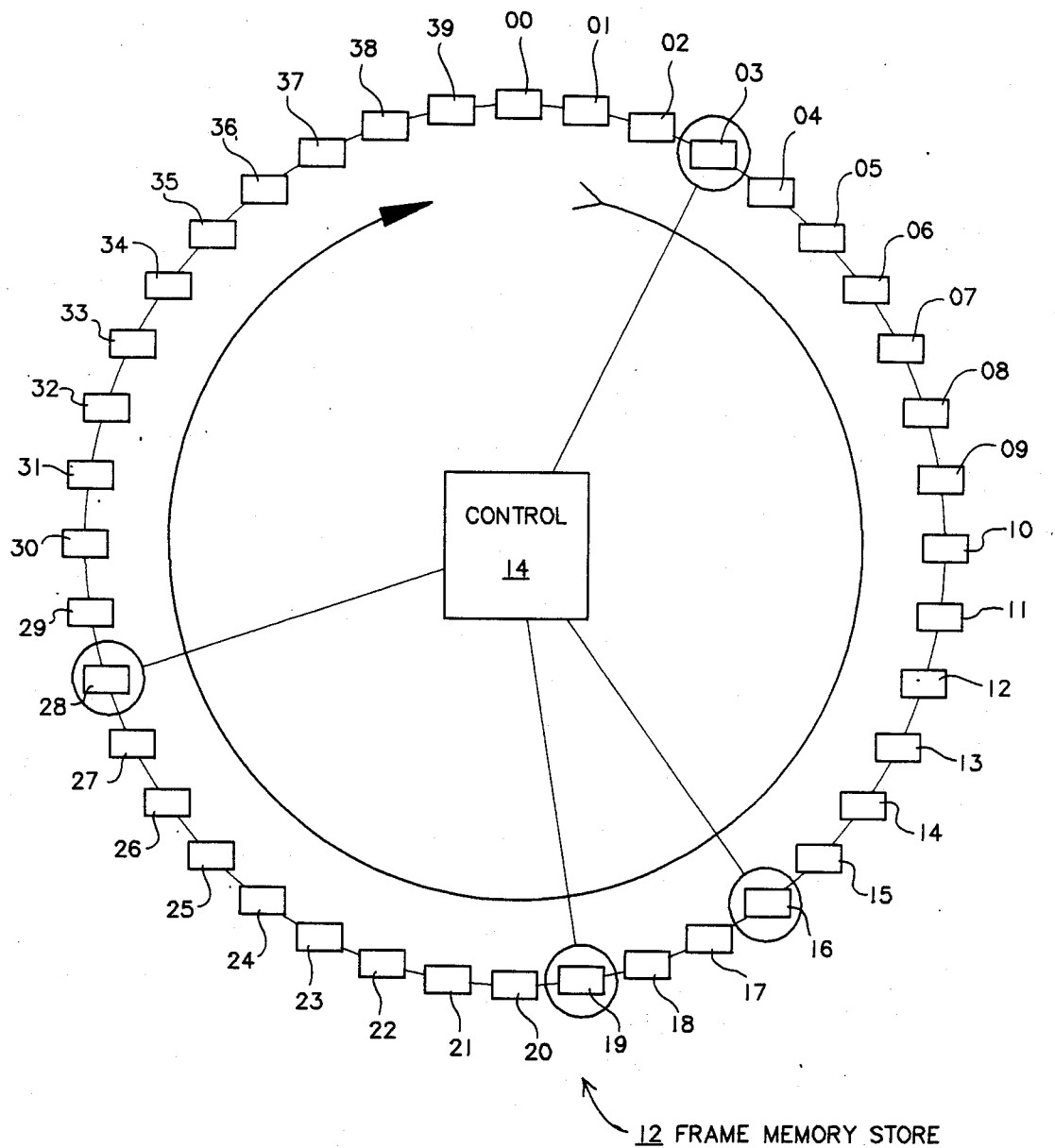
FIG. 2 is a block diagram of the ring memory array of the system depicted in FIG. 1, illustrating the write protect feature for write protecting addresses of selected frames stored in the array.

With reference to FIG. 1, a memory system 10 including a multiple frame memory store 12 and a control 14 is shown diagrammatically within a medical angioplasty operating room environment in which a patient 16 is lying on an operating table 18. X-ray and electrocardiographic equipment 20 includes an anterior/posterior x-ray source 22 and televison camera 24, and a lateral x-ray source 26 and television camera 28. A video recorder 30, such as a tape recorder, is also provided for recording sequences of x-ray images scanned by the cameras 24, 28 during the operating procedures.

Two display monitor consoles 32, 34 are provided, with the upper console for anterior/posterior images and the lower console for lateral images, as is the present operating room convention for the angioplasty procedure. The consoles 32, 34 include two separate display monitors apiece, 36, 38, 40 and 42 so that a selected repeating sequence of image frames from e.g. the anterior/posterior camera 24 may be displayed on one of the upper monitors 36, 38 and a selected still single frame image may be displayed on other of the upper monitors 36, 38. The same multiple display is provided for the lateral camera 28.

The control 14 includes a number of separate operator controls, an anterior/posterior or lateral image switch 44 by which a video source from the anterior/posterior camera 24 or the lateral camera 28 may be selected and appropriately displayed on the appropriate console 32 or 34. There are four "Reserve AP" buttons 46, 48, 50 and 52 for write protecting up to four selected single frames of an anterior/posterior view image sequence, and similarly there are four "Reserve Lat" buttons 54, 56, 58 and 60 for write protecting up to four selected single frames of a lateral view image sequence. Each button 46, 48, 50, 52, 54, 56, 58 and 60 includes an annunciator lamp L, such as an LED, which emits light to signal the operator that a particular frame has been write protected.

A record loop button 62 enables an incoming sequence of video image frames to be recorded in the memory 12. In practice the physician watches the display consoles 32 and/or 34 during an angioplasty procedure, particularly at the moment when an x-ray opaque dye is released into the patient's cardiovascular system and reaches the passages of interest. At that point the record button 62 is depressed and every subsequent incoming frame of video is stored in a frame memory location of the memory 12. Since the memory 12 is arranged as a ring, FIG. 2, the recording process fills all available memory locations and then overwrites previously filled memory locations, until the recording operation is stopped. The switch 62 includes an annunciator LED L which glows when the system 10 is operating in the record mode.

The recording operation ceases when the operator depresses either a pause reverse button 64 or a pause forward button 66. When either of the these buttons is depressed, the system stops recording new incoming frames and displays a single frame pointed to at the time the one of these buttons 62 or 64 was depressed. If a preceding frame of the sequence presently contained in the memory 12 is desired to be seen, the pause reverse button 64 is depressed until the frame of interest is reached. If a subsequent frame is then desired, the pause forward button 66 is depressed until that particular frame is reached.

Once a desired frame is reached by operation of the switches 64, 66, that frame may be saved at an available one of the buttons, 46, 48, 50, 52, 54, 56, 58 or 60. The top row will be used if the image is an anterior/posterior view, and the bottom row will be used if the image is a lateral view, in keeping with established medical convention. Assuming an anterior/posterior view, once an available button 46-52 is pushed, its lamp L glows continuously, and the frame so saved or "write protected" is displayed on e.g. the monitor 36 as a still frame image. Should another frame of the available video frames currently in the memory 12 be saved, as by depression of the keys 64, 66 to reach the frame, followed by depression of e.g. the next available switch 48, the lamp L at the switch 48 now glows constantly and the monitor 36 displays that frame image. Once the switch 48 is depressed, the lamp annunciator form the switch 46 begins to flash, thereby signalling the operator that a selected frame that has been saved, but that it is not currently being displayed on the monitor 36.

In order to display repetitively the frames stored in the memory 12, a play loop button 68 may be depressed, and a lamp L associated therewith glows. This causes the sequence of video frames currently stored in the memory 12 to be repetitively displayed at real time rate (e.g. 30 frames per second) on the monitor 38 (assuming these images are anterior/posterior views). Thus, in this situation, the monitor 36 is displaying a still frame view as selected by the operator and saved by depression of the key 48, while the monitor 38 is displaying a motion picture of a sequence of consecutive frames in which the sequence is repeated over and over again until the control settings are changed.

A bypass switch 70 causes the video signals to bypass the system 10, so that video images from the cameras 24, 28 or from the recorder 30 flow directly to the monitor consoles 32, 34. The bypass switch 70 includes an annunciator lamp L to inform the operator that the system 10 is in the bypass mode. Depressing the bypass switch 70 again returns the system 10 to the video path and causes the lamp L for the switch 70 to extinguish.

A clear switch 72 is provided to clear the frame memory cells which contain images acquired during operation of the system 10. Depressing both the clear switch 72 and the play loop button 68 for a memory cycle sequence causes all of the still frames previously saved to be cleared, and the lamps L at the switches corresponding to those frames (e.g. the switches 46 and 48 previously described) to extinguish. The system is then ready for a new procedure including a new sequence of video frame images.

A gamma factor selector 74 enables selection of one of a range of gamma factor corrections to be made in at least one of the output channels of the system feeding the consoles 32, 34. A manual timing selector control 76 enables the operator to select and control the framing time or length of the series of image frames to be stored in the memory 12 before it is reset and repeats the recording sequence. The control 76 preferably includes a switch at one position which selects an external source of timing information, such as heartbeat, supplied by the medical equipment 20 over a control line 78. With this feature, the system 10 may be automatically configured to capture and play back a sequence of a selected single heartbeat, so that the contortions and motions of the heart during its full cycle, and nothing else, are constantly repeated for observation by the treating physician.

FIG. 2 illustrates diagrammatically the architecture of the ring memory 12 in association with the control 14. Preferably there are at least forty frame storage locations in the memory 12, frames 00 through 39, for the described medical angioplasty application. At a real time display rate of thirty frames per second, a continuous sequence of frames, up to four/thirds of a second in duration may be stored in the memory 12. When the record loop button 68 is depressed, the first frame is stored in location 00. Each incoming frame is then stored in a location up to location 39. The next incoming frame overwrites the first frame data in location 00, and so forth.

When either the pause reverse button 64 or the pause forward button 66 is depressed, recording ceases, as does memory address cycling of the memory 12. When a frame to be write protected is located such as frame 03 in FIG. 2 and a write protect button is depressed such as the button 46, the frame 03 becomes write protected as shown by the circle drawn around this memory frame in FIG. 2. What this circle denotes is that subsequent record operations (except for clear all operations) will automatically bypass frame 03, and its data will remain intact without change. Other frames, such as frame 16, frame 19 and frame 28 may likewise be write protected in the same manner. Once frames 03, 16, 19 and 28 are write protected, any subsequent record operations of the system will automatically bypass these frame locations, in a manner to be described in connection with FIG. 4, hereinafter.

Figure 3:
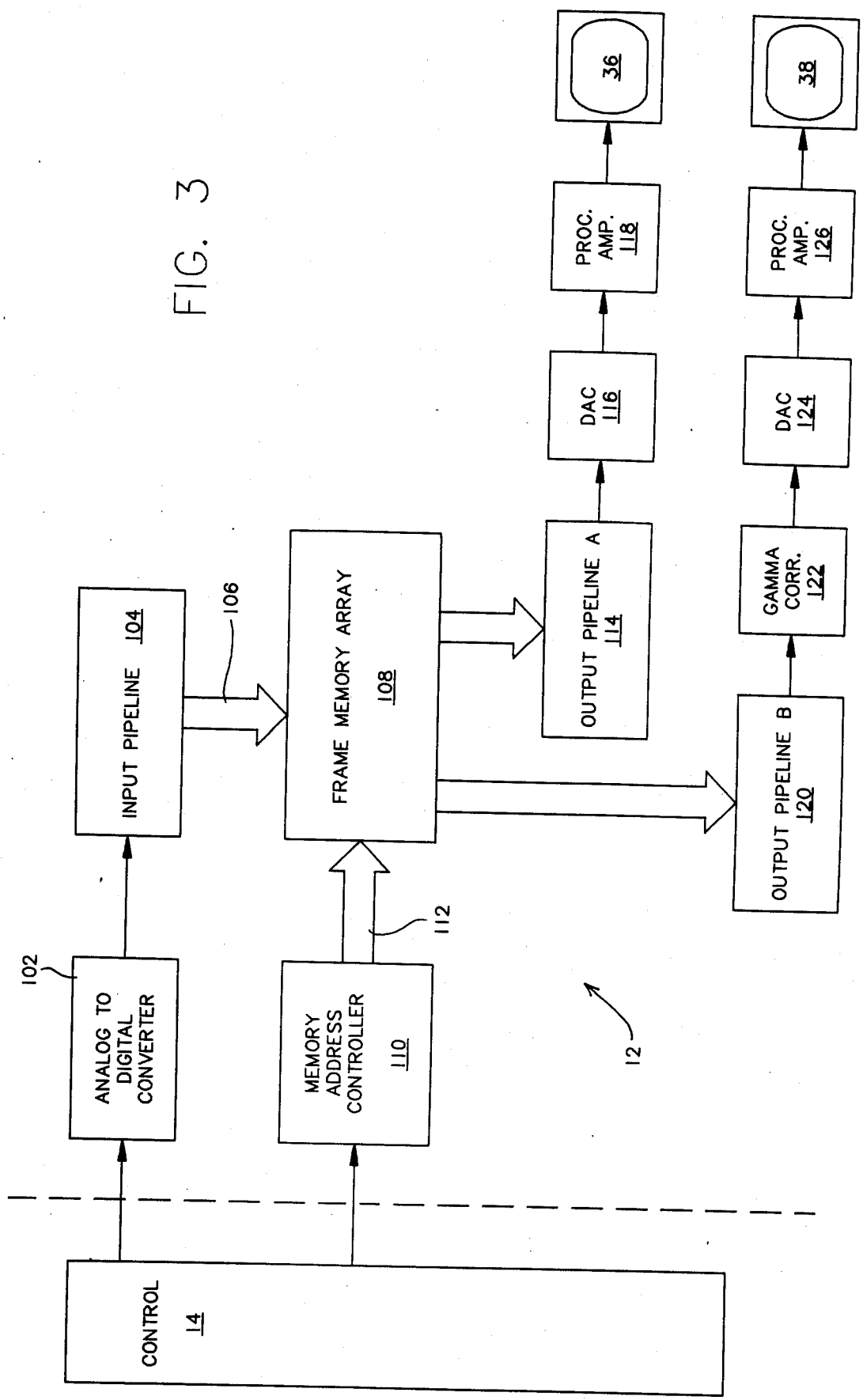
FIG. 3 is a block diagram of the memory array architecture of the system depicted in FIG. 1, illustrating two pipeline output channels.

FIG. 3 depicts the architecture of the memory 12. A selected analog serial video stream from the control 14 enters a high speed analog to digital converter 102 which is clocked at a 15 MHz clocking rate. The converter 102 converts 768 picture values (pixels) for each scanning line, and converts 512 scanning lines per frame into digital values for a total of 393,216 8-bit bytes per video frame. These bits are put out as a serial binary data stream to an input pipeline 104 which frames the serial stream into blocks of 12 bytes (96 bits) and passes these blocks over a parallel bus 106 into a semiconductor memory array 108 arranged as 96 bits by 4096 bits per frame times 40 frames, frames 00 through 39 (FIG. 2).

A memory address controller 110 generates addresses which are supplied over an address bus 112 to the array 108 in order to operate the array as a ring.

An output pipeline A 114 receives 12 byte blocks. A digital to analog converter 116 converts the blocks into an analog serial data stream. A processing amplifier 118 adds appropriate synchronizing and blanking pulses to the analog signal in conventional manner, and the resulting composite signal is available for display on one of the consoles at e.g. the display 36.

An output pipeline B 120 receives 12 byte blocks from the memory array 108. A digital gamma correction circuit 122 may be provided at the output of the second pipeline 120. This circuit 122, including the selector 74 at the control 14, preferably includes a selectable series of lookup tables stored in a read only memory. The selector causes one of the lookup tables to be selected, and its values determine gamma correction for each outgoing digital pixel value in relation to adjacent values, so that the dynamic range of the video signal (contrast) may automatically be varied to add sharpness to the picture image as may be required.

A second digital to analog converter 124 converts the digital pixel bytes into analog serial data stream which is processed by a second processing amplifier 126 and then available for display on one of the monitors, e.g. the monitor 38.

Circuit details of pipeline registers, memory controllers and a memory array are set forth in the assignee's co-pending U.S. patent application Ser. No. 06/707,836, filed on Mar. 4, 1985, entitled "Audio Visual Monitoring System", particularly in connection with the description therein accompanying FIG. 6, the disclosure of which is incorporated herein by reference thereto. Further structural details for a frame memory are set forth in the assignee's co-pending U.S. patent application Ser. No. 06/753,324, filed on July 9, 1985, entitled "Video Data Acquisition and Display Scan Converter", reference to which is made for further particulars.

With reference to the control logic circuit diagram (FIG. 4), an eight bit keyboard encoder 130 is connected to the eight write protect keys 46, 48, 50, 52, 54, 56, 58 and 60, and it encodes conditions at the keys into four bits. Three of these bits set a count into a four bit counter 132, the count of which is used to address a random access memory array 134. The memory array is sized to be able to contain in binary notation the numbers of the frames of the ring memory 12, and thus, for a forty frame memory 12, the memory must be six bits in length, by eight bits, the eight bits corresponding to the eight write protect switches. In other words, when a write protect switch 46-60 is depressed, the frame number for the frame to be write protected (e.g. frame 03 in FIG. 2) is loaded into the memory 134 at an address corresponding to e.g. switch 46.

Figure 4:
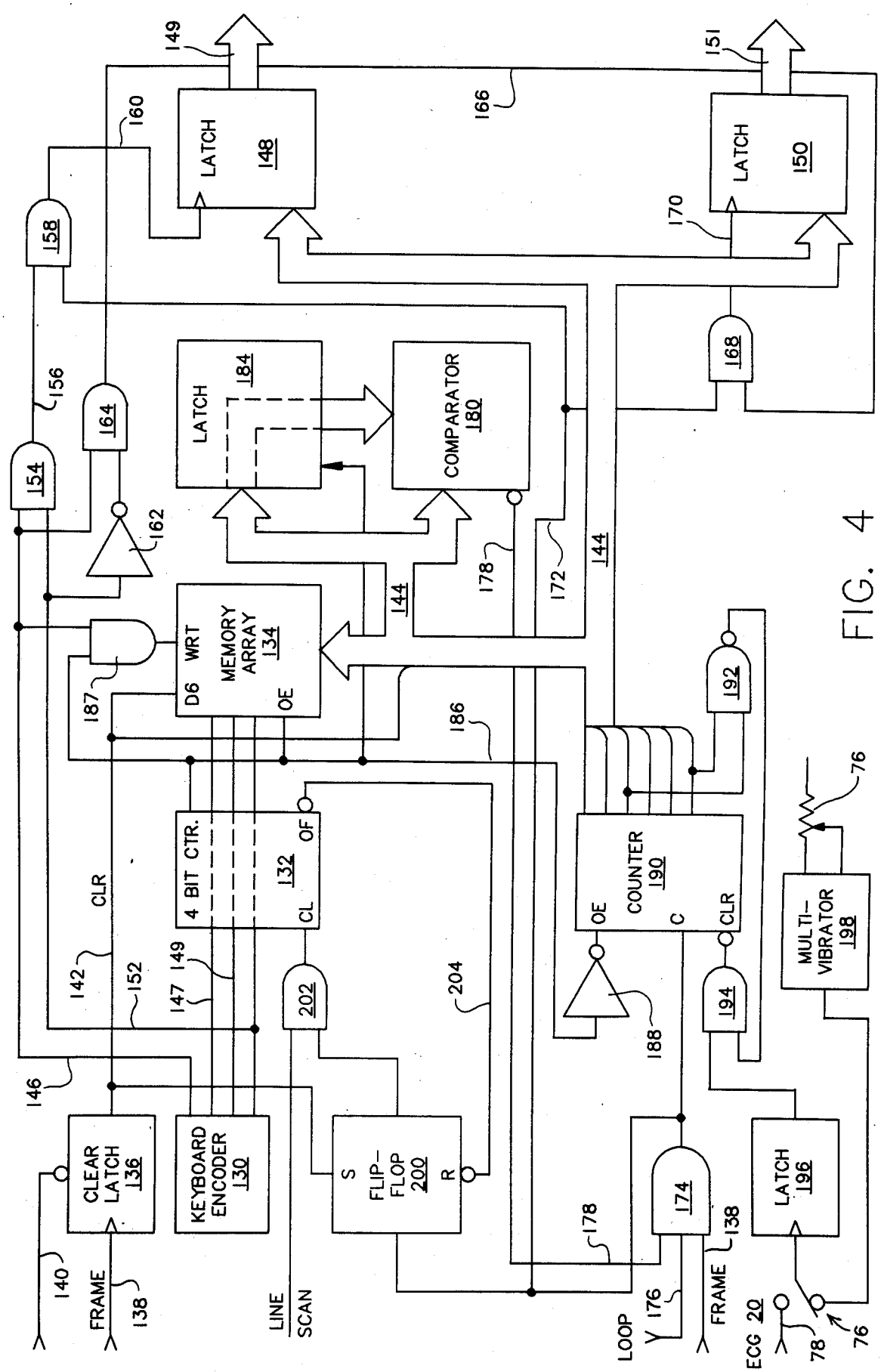
FIG. 4 is a more detailed block and logic element diagram for a memory array control circuit of the system depicted in FIG. 1.

The line 142 which is a clear signal path, described below, is the sixth data bit line D6 of an eight bit tri-state data bus 144 which extends to many of the major elements of the FIG. 4 circuit.

The encoded output of the keyboard encoder 130 is present on four lines 146, 147, 149 and 152, the line 146 being an indication that a button is active, the line 147 being the least significant bit, the line 149 being the intermediate bit and the line 152 being the most significant bit (it requires three bits to identify the eight write protect switches 46-60) The active line 146 and the most significant bit line 152 are used to determine which of two output tri-state address latches 148 or 150 will be enabled. The inclusion of the two latches 148, 150 enables the memory array 12 to be divided into two separately addressable segments, e.g. an anterior/posterior segment and a lateral segment. Each segment may be of suitable length, such as forty frames, and FIG. 2 should be understood as depicting one or the other of the memory segments. As explained, memory length is determined in design by the length of a particular cycle to be recorded and minutely observed through multiple cyclical playbacks, whether a medical procedure such as a heartbeat or a complicated industrial control process, etc.

The circuitry enabling either the latch 148 or the latch 150 to be enabled includes a gate 154 having an output line 156 connected to a gate 158 having an output 160 which enables the latch 148. An inverter 162 on the msb line 152 drives a gate 164 having an output on a line 166 which goes through gate 168 to enable the latch 150 by virtue of a signal on an output line 170. As is apparent from this array, either the latch 148 or the latch 150 will be enabled at a time, but not both.

A control signal on a line 172 commonly enables the gates 158 and 168, and this signal is either a frame pulse on the line 138, a loop signal on a line 176 which is enabled whenever it is desired to have the memory array 12 loop or its addressing cyclically repeat, or an EQUAL signal present on a line 178, to be explained shortly, all of which are inputs to an AND gate 174.

A tristate counter 190 is clocked by the signal present on the line 172 which is the output line from the OR gate 174. The count contained in the counter 190 is the frame count of the frame presently being recorded (or accessed during playback) in the memory array 12. This count is gated onto the bus 144 and it is stored in the memory 134 when it is enabled by a write pulse. It is stored at an address controlled by the count of the counter 132 as already explained.

Each count put out by the counter 190 is passed over the bus 144 so that it may be latched and held in a latch 184. Then, the counter 190 is removed from the bus 144 by a signal put out by the counter 132 over a line 186 and inverted by an inverter 188. This signal line 186 also extends to operate the latch 184, and it enables the output from the memory 134. The memory 134 is then cycled by action of the counter 132 through its eight addresses with any frame numbers stored at any of the eight addresses put over the bus 144 to a comparator 180. The comparator 180 compares each frame number output from the memory 134 over the bus 144 with the count value then latched and held in the latch 184. If an equivalence is detected a signal is put out by the comparator 180 over the line 178. This signal causes the counter 190 to increment by one count when the next frame pulse arrives over the line 138 and the loop line 176 is enabled, thereby causing the counter 190 to count to the next frame number and thereby bypassing and "write protecting" the frame number for which there is a write protect value stored in the memory 134.

The counter 132 is clocked at a high frequency rate such as the line scan rate (15,750 KHz) which is applied to a clocking input of the counter 132 through a gate 202. The gate 202 is enabled by a signal from a flip-flop 200 which is set by a clear signal on the line 142 and reset by an overflow signal from the counter 132 on a line 204. The flip-flop 200 is clocked at the frame rate by virtue of the signal on the line 172. This clocking rate enables the memory 134 to cycle through its addresses very rapidly.

The memory 134 is written whenever a write enable signal is supplied by a write gate 187. This gate is enabled by the coincidence of a button active signal on the line 146 and the output enable signal put out on the line 186 by the counter 132.

The memory 134 is cleared by a signal generated at a clear latch 136 which responds to the clear button 72 by virtue of a signal on a line 140. The latch 136 is clocked at the 30 Hz frame rate signal on the line 138. The latch 136 puts out a clear signal on the line 142, which is bit 6 of the tri-state bus. This bus position is monitored by a gate 192 which drives a clear gate 194 which clears the counter 190. Whenever the counter 190 is cleared it puts zero-value bytes on the tri-state bus 144 and these zero-value bytes are written in sequence into the memory 134 thereby erasing the write protected values earlier stored therein.

A latch 196 also enables resetting of the counter 190 in response either to an externally supplied reset signal, such as a heartbeat pulse from an electrocardiograph instrument 20 over the line 78, or in response to an internally generated clock signal derived from a free running multivibrator 198 having its cyclical period established by the control 76.

Although the presently preferred embodiment is directed to a medical treatment application, it will immediately be appreciated that the system 10 and simple adaptations thereo are directly applicable to a wide variety of applications, such as providing a short delay for a television broadcast signal in order to enable excision of unwanted picture content in real time, and for providing an analytical tool for the study of ephemeral mechanical or biological processes where understanding thereof is facilitated by repeated study of a single event or cycle.

To those skilled in the art many changes in construction and widely varying embodiments will be suggested by the foregoing description of a preferred embodiment without departure from the spirit or scope of the present invention. The disclosures herein are purely illustrative and are not intended to be in any sense limiting of the scope of the present invention as more particularly set forth in the following claims.

We claim:

1. For inclusion in a video path including a source of television picture images and a display, a memory for storing and for repetitively playing back at the display a consecutive sequence of picture frames derived from the source, the memory comprising:

input means for receiving said consecutive sequence of picture frames as digitized picture element values in a serial bit stream and for framing said stream into consecutive constant length pluralities of digital picture element words, read/write solid state semiconductor frame memory array means arranged as a ring for storing and playing back a predetermined number of said consecutive video picture image frames, output means for receiving constant length pluralities of digital picture element words read from said memory array means and for converting them into an analog picture signal for display on the display, read/write memory array control means for controlling writing to and reading from said frame memory array means so that a selected segment of said consecutive video picture frames may be repeatedly played back without interruption at real time image display rate.

2. The memory set forth in claim 1 wherein said read/write memory array control means includes write protect means for enabling an operator to single step through a series of said consecutive frames written in the array means, said write protect means for generating and storing at least one write protection value for write protecting at least one of the said frames so written, said read/write memory array control means including means for skipping said at least one write protected frame during subsequent write operations of said memory array means, and further comprising clear means included in said memory array control means for clearing said at least one write protection value.

3. The memory set forth in claim 2 wherein said output means includes two independent output paths so that a single write protected frame may be put out for display on one display on one of the paths and a sequence of said consecutive frames may be put out for display on the other of the paths.

4. The memory set forth in claim 1 wherein said output means includes digital gamma correction means for varying the dynamic range of consecutive picture elements.

5. The memory set forth in claim 4 wherein the gamma correction means includes a plurality of table lookups contained in a read only lookup memory and selector means for selecting and processing one of the lookup tables to provide selected gamma correction.

6. The memory set forth in claim 1 including variable frame number selection means for varying the number of said consecutive picture frames to be stored during a single write loop through said ring memory array means.

7. The memory set forth in claim 6 wherein said variable frame number selection means includes means for receiving and processing external frame number selection information.

8. The memory set forth in claim 6 wherein said variable frame number selection means includes a manual frame number selector.

9. The memory set forth in claim 1 wherein said read/write memory array control means includes a manual write control for enabling initiation of writing of said consecutive frames into said memory array means.

10. The memory set forth in claim 1 wherein said read/write memory array control means includes a manual playback control for causing said memory array means to cease writing consecutive frames and for causing said memory array means to read out repetitively the consecutive picture frames then stored therein.

11. The memory set forth in claim 1 wherein said read/write memory array control means includes manual single step means for causing said memory array means to read out one of said consecutive picture frames the stored therein as selected by said single step means from the available ones of said stored picture frames.

* * * * *